United States Patent [19]
Yoshimura

[11] Patent Number: 5,907,716
[45] Date of Patent: May 25, 1999

[54] FIFO BUFFER CAPABLE OF PARTIALLY ERASING DATA SET HELD THEREIN

[75] Inventor: Noritsugu Yoshimura, Yokohama, Japan

[73] Assignee: Fujitsu Limited, Kawasaki, Japan

[21] Appl. No.: 08/829,953

[22] Filed: Apr. 1, 1997

[30] Foreign Application Priority Data

May 2, 1996 [JP] Japan .................................... 8-111439

[51] Int. Cl.[6] .............................. G06F 15/00; G06F 15/76
[52] U.S. Cl. ............................................ 395/874; 395/876
[58] Field of Search .................................... 395/876, 874, 395/877, 873, 872, 875, 885, 821; 362/221; 711/1, 100, 103, 113

[56] References Cited

U.S. PATENT DOCUMENTS

| 5,644,539 | 7/1997 | Yamagami et al. ...................... 365/200 |
| 5,771,366 | 6/1995 | Bjorksten et al. ...................... 395/393 |
| 5,778,420 | 2/1996 | Shitara et al. ........................... 711/113 |
| 5,784,597 | 9/1995 | Chiu et al. ................................ 395/552 |

*Primary Examiner*—Eddie P. Chan
*Assistant Examiner*—Kimberly McLean
*Attorney, Agent, or Firm*—Staas & Halsey

[57] ABSTRACT

A FIFO buffer capable of erasing any particular data set or sets without influencing the data sets not to be erased. At the time of writing data sets into the FIFO buffer, the starting point of the data set is recognized and the pointer value of the write pointer at that time is stored in a pointer buffer. When an erase instruction is given, the pointer value stored in the pointer buffer is loaded at the write pointer or the read pointer in response to the erase instruction. By this, the data sets after the specified pointer value or the data sets before the specified pointer value at the pointer value conforming to the data set to be erased in the pointer buffer. When the value of the read pointer reaches a pointer value to which the erase flag is attached, the value of the read pointer is made to skip to the next pointer value. By this, it is possible to erase any particular desired data set or sets as well.

22 Claims, 8 Drawing Sheets

Fig. 4A
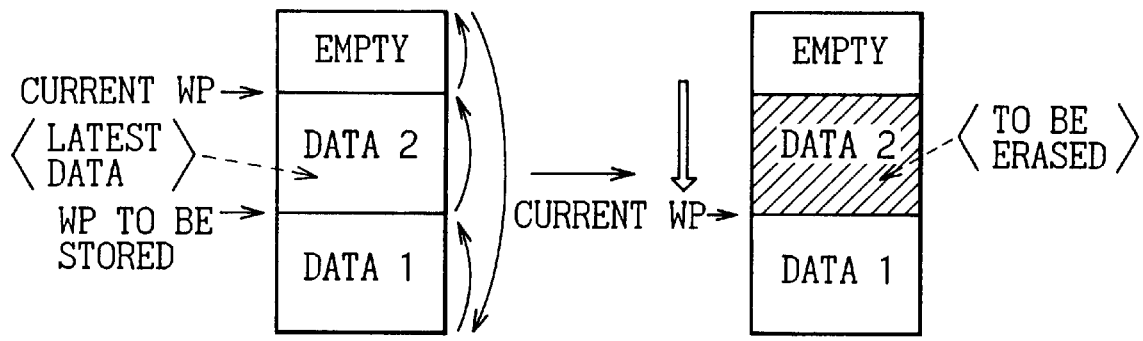
Fig. 4B
Fig. 4C
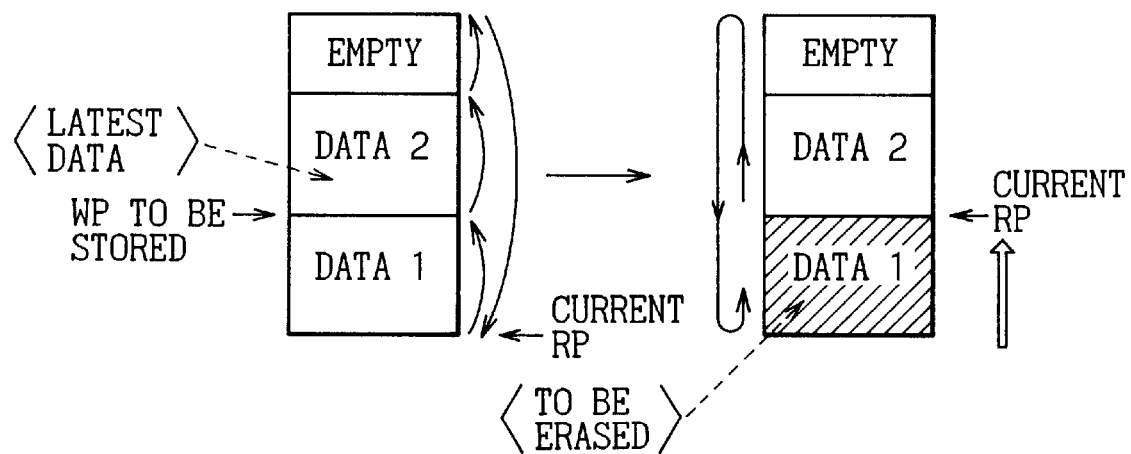
Fig. 4D

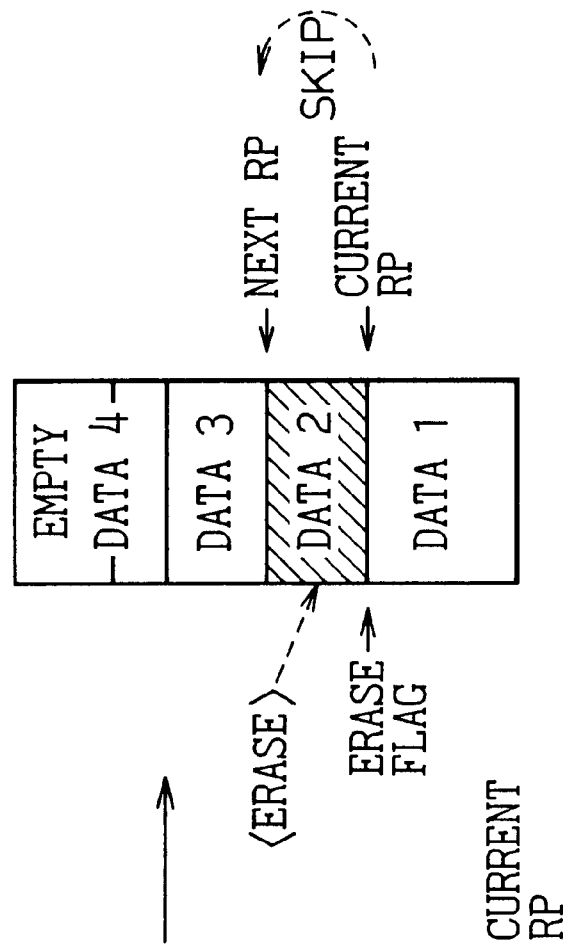
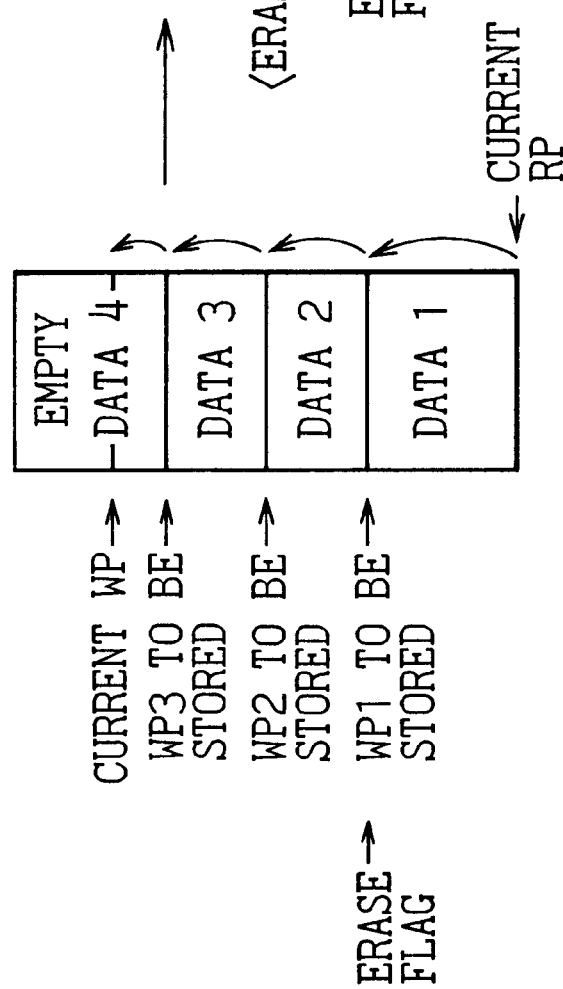

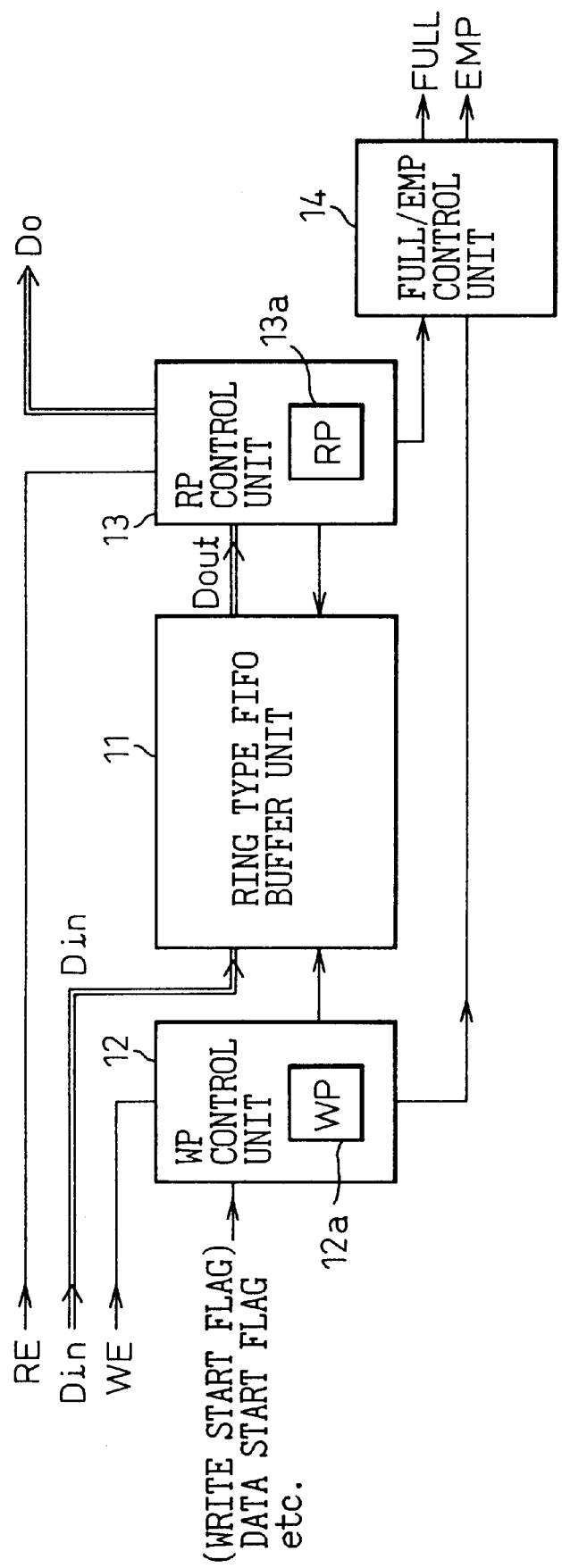

FIFO BUFFER CAPABLE OF PARTIALLY ERASING DATA SET HELD THEREIN

BACKGROUND OF THE INVENTION

1. Field of the Invention

The present invention relates to a first-in first-out (FIFO) buffer capable of storing a plurality of data sets having different data lengths, more particularly relates to a FIFO buffer capable of partially erasing data sets.

2. Description of the Related Art

Known in the art is a FIFO buffer (hereinafter referred to as a "FIFO") provided with a memory circuit, a write pointer for specifying an address for writing to that memory circuit, and a read pointer for specifying an address for reading from that memory circuit. This buffer compares the pointer values of the write pointer and the read pointer and detects a full/empty state of the memory circuit to control the writing and reading of data sets.

As will be explained later by reference to the drawings, in a FIFO having this conventional configuration, it is impossible to erase a particular data set or sets among the stored data sets.

Partial erasure of the data sets would become possible by using a plurality of FIFOs. However, in a FIFO which should store therein a plurality of data sets having different data lengths, ordinarily just a single FIFO is used from the viewpoint of storage efficiency. To erase a particular data set in that FIFO, it is necessary to clear out at least all of the data sets to be erased. During this clear out operation, it becomes impossible to write any data set into the FIFO.

As explained above, in a conventional FIFO, there was a problem in that it was not possible to erase a particular data set without clearing out all of the data sets to be erased.

SUMMARY OF THE INVENTION

The present invention was made so as to solve the problem of the related art described above and has as its object to provide a FIFO buffer, when there is data desired to be erased, capable of erasing any particular data set or sets without influencing the data sets not to be erased by controlling stored values of a read pointer or a write pointer.

To attain the above object, the present invention provides a FIFO buffer operating as follows. At the time of writing data sets into the FIFO buffer, the FIFO buffer recognizes the starting point of the data set and stores the pointer value of the write pointer at that time in a pointer buffer. When an erase instruction is given, the FIFO buffer loads the pointer value stored in the pointer buffer at the write pointer or the read pointer in response to the erase instruction. This enables the data sets after the specified pointer value or the data sets before the specified pointer value to be erased.

Further, the FIFO buffer sets an erase flag at the pointer value conforming to the data set to be erased in the pointer buffer. When the value of the read pointer reaches a pointer value to which the erase flag is attached, the value of the read pointer is made to skip to the next pointer value. By this, it is possible to erase any particular desired data set or sets as well.

BRIEF DESCRIPTION OF THE DRAWINGS

The above object and features of the present invention will be more apparent from the following description of the preferred embodiments with reference to the accompanying drawings, wherein:

FIGS. 4A to 4D are views explaining an erasing operation by the partial erase control unit of FIG. 3;

FIGS. 7A and 7B are views explaining the erasing operation by the partial erase control unit of FIG. 6; and FIG. 8 is a view of an example of a conventional FIFO buffer.

DESCRIPTION OF THE PREFERRED EMBODIMENTS

Figure 1:
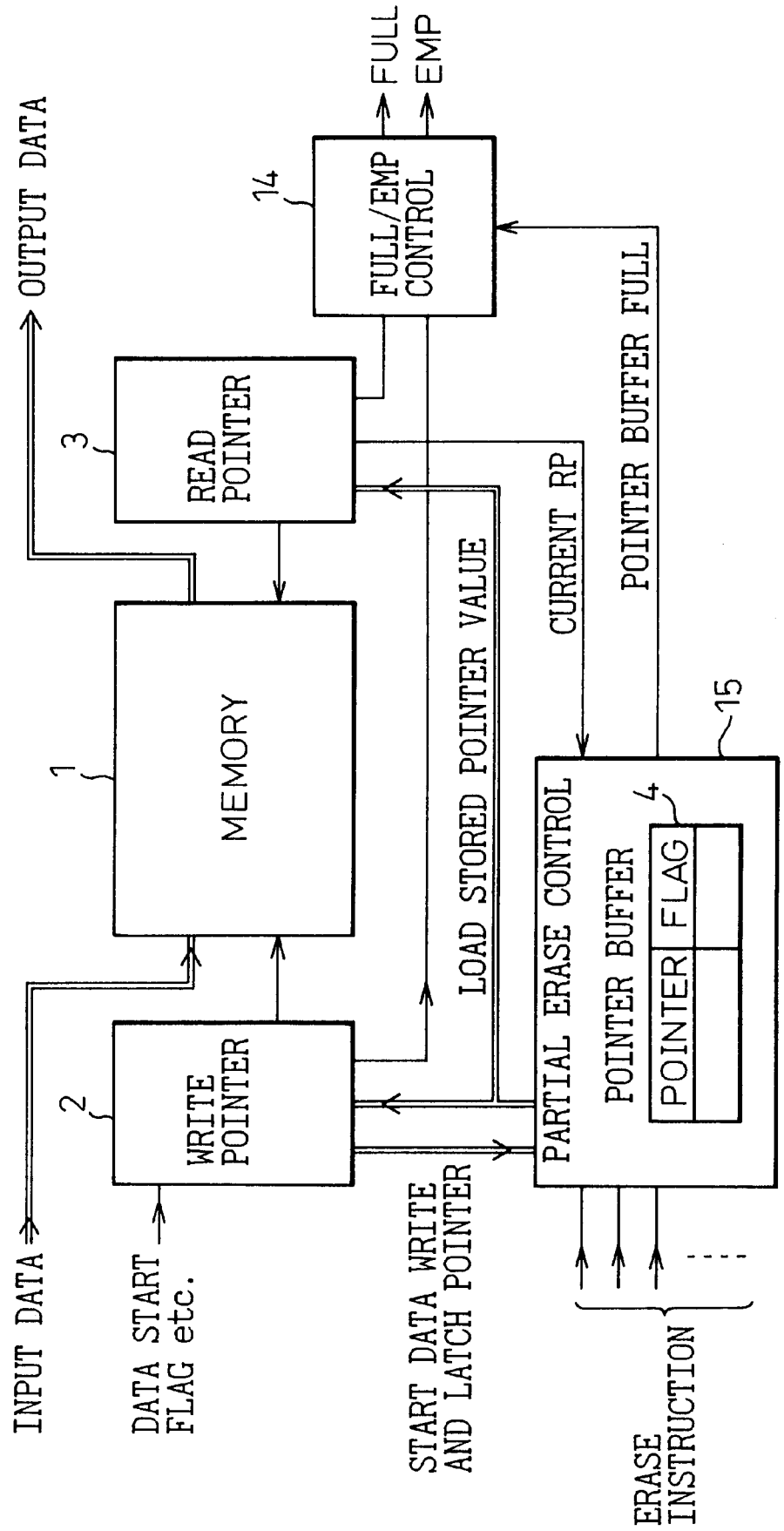
FIG. 1 is a view of the principle of the present invention.

Before describing the embodiments of the present invention, the related art and the disadvantages therein will be described with reference to the attached figures.

FIG. 8 is a view of the configuration of a conventional FIFO.

In the figure, a ring type FIFO buffer unit 11 is for storing data sets, a write pointer control 12 is unit provided with a write pointer (WP) 12a, a read pointer control unit 13 is provided with a read pointer (RP) 13a, and a full/empty (EMP) control unit 14 is provided.

In the figure, if the FIFO is not full and if a write enable signal WE is given, input data Din is written at an address in the ring type FIFO buffer unit 11 indicated by the write pointer 12a and the write pointer 12a is incremented by one.

On the other hand, if the FIFO is not empty and if a read enable signal RE is given, the data set at an address indicated by the read pointer 13a is read out from the ring type FIFO buffer unit 11. The read-out data is output as an output data Dout and the read pointer 13a is incremented by one.

The full/empty (EMP) control unit 14 compares the value of the write pointer 12a and the value of the read pointer 13a and outputs a full signal FULL or an empty signal EMP.

In the above conventional configuration of a FIFO, however, it is impossible to erase a particular data set in the stored data, as explained earlier.

Partial erasure among the data sets would be possible if using a plurality of FIFOs. However but when storing a plurality of data sets having different data lengths, ordinarily just a single FIFO is used from the viewpoint of storage efficiency. To erase a particular data set in one FIFO, it is at least necessary to clear out all of the data sets to be erased. During the above erasure operation, it becomes impossible to write a data set into the FIFO.

As explained above, in a conventional FIFO, there was a problem in that it was not possible to erase a particular data set without clearing out all of the data sets to be erased.

The present invention enables erasure of any particular data set or sets without influencing the data sets not to be erased. This is accomplished by storing and controlling the value of the read pointer or the value of the write pointer when there is data set desired to be erased.

FIG. 1 is a view of the principle of the present invention. In the figure, a memory means 1 is for storing a plurality of data sets. A write pointer 2, and a read pointer 3 are provided. An input data set is written at an address of the memory means 1 indicated by the write pointer 2. A data set is read from the address of the memory means 1 indicated by the read pointer 3.

Further, a pointer buffer 4 is provided for partially erasing data set or sets stored in the memory means 1. When writing a data sets into the memory means 1, the starting point of the data set is recognized and the pointer value of the write pointer 2 at the recognition is written into the pointer buffer 4.

When an erase instruction is given from the outside, a pointer value based on the erase instruction is read from the pointer buffer 4. This read pointer value is then loaded into the write pointer 2 or the read pointer 3.

The above problem can be solved by the following seven aspects of the present invention shown in FIG. 1.

First aspect

There is provided a FIFO buffer provided with a memory means 1 for storing a plurality of data sets; a write pointer 2 for specifying an address for writing a data set into the memory means 1; a read pointer 3 for specifying an address for reading a data set from the memory means 1; and a pointer buffer 4 for storing a pointer value—when writing the data sets into the FIFO buffer and recognizing the starting point of the data set. The stored pointer value is the value the write pointer 2 at the recognition.

In response to an erase instruction, the pointer value stored in the pointer buffer 4 is loaded into the write pointer 2 or the read pointer 3. Thereby, a part of the data sets stored in the memory means 1 is erased.

Second aspect

Preferably, a plurality of memory regions are provided in the pointer buffer 4 and the pointer values of the write pointer 2 are stored in respective memory regions of the pointer buffer 4 every time when a data set is written into the memory means 1.

Third aspect

Preferably, the most recently written data set is erased, or the data sets after any particular pointer value are erased by loading the pointer value stored in the pointer buffer 4 into the write pointer 2.

Fourth aspect

Preferably, all data sets except the latest written data set, or all data sets before any particular pointer value, are erased by loading the pointer value stored in the pointer buffer 4 into the read pointer 3.

Fifth aspect

Preferably, the pointer buffer 4 is provided with a region for holding an erase flag. When the value of the read pointer 3 reaches the pointer value to which the erase flag is attached, the pointer value next to the pointer value to which the erase flag is attached is loaded into the read pointer 3. Thereby the data set of the pointer value to which the erase flag is attached is erased.

Sixth aspect

Preferably, the pointer value to be loaded into the write pointer 2 or the read pointer 3 is directly given from the outside.

Seventh aspect

Preferably the pointer value to be loaded into the write pointer 2 or the read pointer 3 is determined by specifying the address of the pointer buffer 4.

By constituting the FIFO buffer of the present invention in this way, part of the data sets stored in the memory means 1 can be erased without effecting any influence on the data sets not to be erased.

For this reason, the efficiency and transfer rate of the FIFO buffer can be improved.

Figure 2:
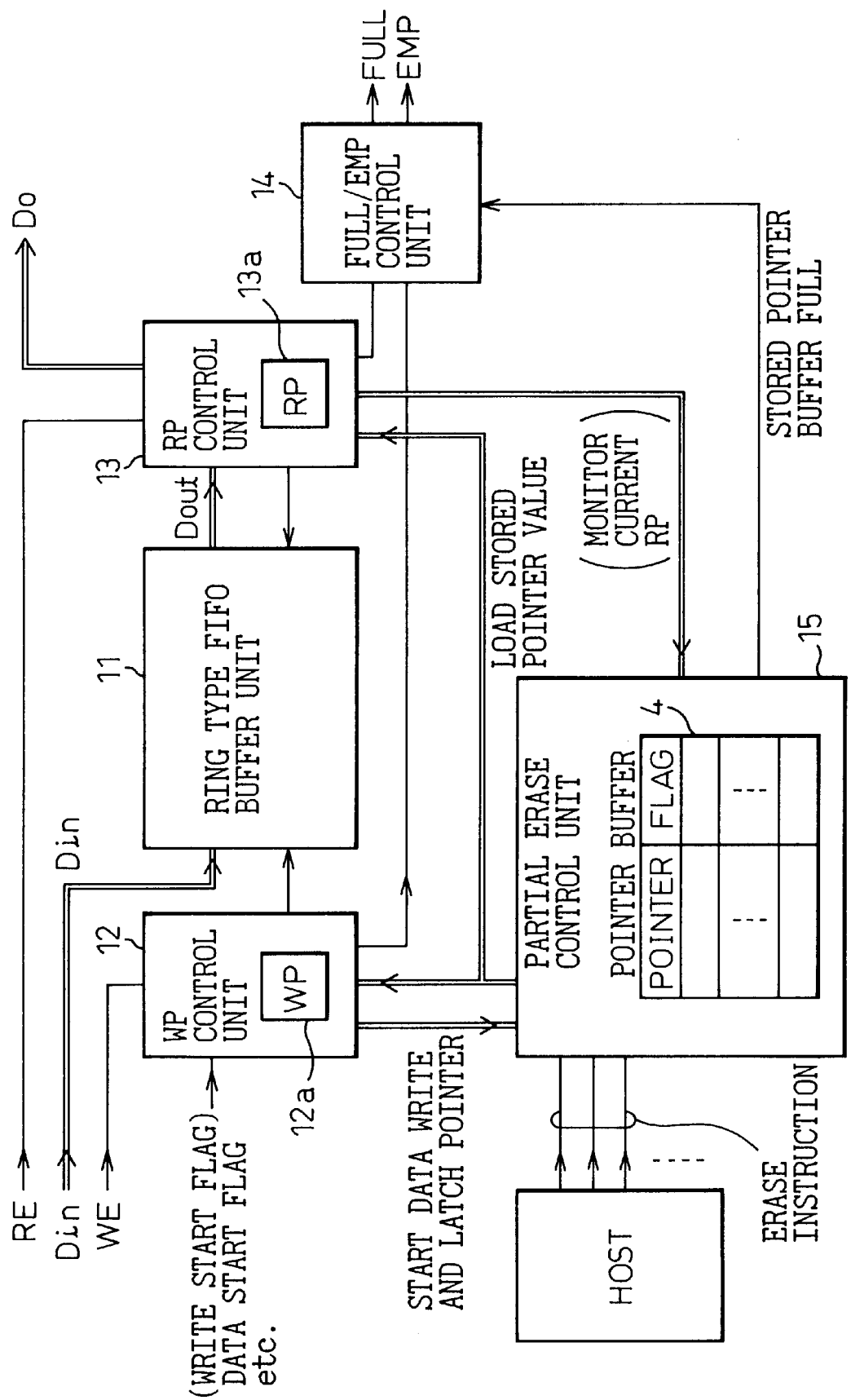
FIG. 2 is a view of the overall configuration of a FIFO of an embodiment of the present invention.

FIG. 2 is a view of the overall configuration of a FIFO of an embodiment of the present invention. The FIFO of the present embodiment is obtained by adding a partial erase control unit 15 to the FIFO shown in FIG. 8 and described above. The partial erase control unit 15 is used to erase any desired data set among the data sets stored in the FIFO.

Next, an explanation will be made of the above partial erase control unit 15.

Figure 3:
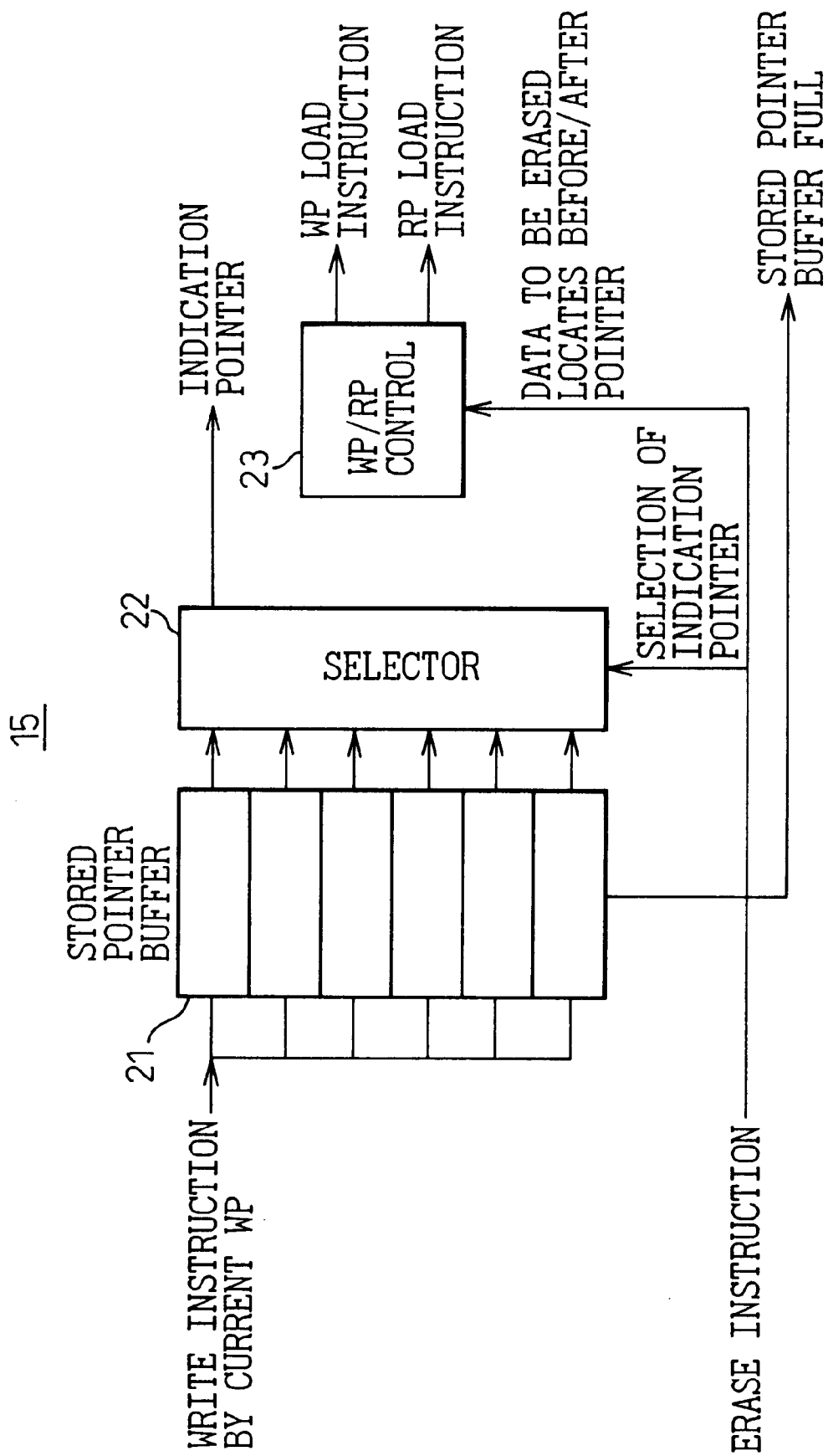
FIG. 3 is a view of a first embodiment of a partial erase control unit.

FIG. 3 is a view of a first embodiment of the partial erase control unit 15.

In the figure, a stored pointer buffer 21 is provided with a memory region of a size conforming to all pointer values of the data sets which can be stored in the FIFO shown in FIG. 2. When a write instruction (e.g., WE) is input to the FIFO, the write pointer value indicated by the write pointer (WP) 12a shown in FIG. 2 is stored in that memory region.

When the value indicated by the read pointer (RP) 13a (FIG. 2) of the FIFO exceeds the pointer value stored in the stored pointer buffer 21, the pointer values in the stored pointer buffer 21 that are smaller than the read pointer value are discarded and the pointer values in the stored pointer buffer 21 that are larger than the pointer value indicated by the write pointer 12a of FIFO are discarded. Namely, only the pointer values of the data sets which can be read from the FIFO are stored in the stored pointer buffer 21.

Further, when the stored pointer buffer 21 becomes full, the stored pointer buffer 21 outputs a stored pointer buffer full signal.

This stored pointer buffer full signal is given to the full/empty control unit 14 shown in FIG. 2. The full/empty control unit 14 outputs a full signal when the stored pointer buffer full signal is input or the FIFO shown in FIG. 2 becomes full.

Note that in some cases where only a write enable signal WE is given from the outside and it is not possible to recognize the data break of each data set. In such a case a signal indicating the break of each data set, such as data start flags, is input from the outside and a write pointer value indicating the header of each data set is written into the stored pointer buffer 21, as shown in FIGS. 1 and 2.

Reference numeral 22 shows a selector, which selects and outputs a write pointer value stored in the stored pointer buffer 21 in response to the content of the erase instruction when an erase instruction is input.

The erase instruction is comprised of for example, a "position of pointer" or "address of stored pointer buffer 21" and "control signal". The pointer value in the buffer unit 11 of the FIFO in which the data to be erased is stored according to the "position of pointer", is directly specified, alternatively the address in the stored pointer buffer 21 in which the pointer value of the data set to be erased is stored is specified by the "address of stored pointer buffer 21".

Further, the above control signal specifies portions to be erased such as the data sets located before the position of the specified pointer, the data sets located after the position of the specified pointer, and the like.

A WP/RP control unit 23 outputs an instruction for loading the write pointer value selected by the selector 22 into the write pointer 12a or read pointer 13a shown in FIG. 2 based on a control signal contained in the erase instruction.

FIGS. 4A to 4D and 5A to 5D are views explaining the operation of the present embodiment. First, an explanation will be given of the erasing operation of the present embodiment by FIGS. 4A to 4D with reference to FIG. 2 and FIG. 3.

FIGS. 4A to 4D are views explaining the operation in a case where the latest data set is erased and a case where all of the data sets are erased except the latest data set.

In FIG. 3, when a write instruction (WE) is given, as described before, the input data Din is written at the address in the ring type FIFO buffer unit 11 indicated by the write pointer 12a of FIG. 2 and the write pointer is incremented by one. Further, at the point of time when the write instruction is input, the value of the write pointer 12a is stored in the stored pointer buffer 21 shown in FIG. 3.

Below, similarly, every time when a write instruction (WE) is given, the value of the write pointer 12a is stored in the stored pointer buffer 21 shown in FIG. 3.

Here, as shown in FIG. 4A, the data sets represented by "data 1" and "data 2" are stored in the FIFO. When the write pointer is located at the position of the current write pointer (WP) of the figure, where the latest data set ("data 2" of the same figure) is to be erased, "erase the latest data set" is commanded by the erase instruction.

When the above erase instruction is given, the selector 22 shown in FIG. 3 selects the previously stored write pointer value, that is, the pointer position of "data 2", from among the pointer values stored in the stored pointer buffer 21 and outputs the selected one. The WP/RP control unit 23 loads the pointer position ("WP to be stored" of FIG. 4A) into the write pointer 12a of FIG. 2.

As a result, as indicated by "current WP" of FIG. 4B, the value of the write pointer 12a of FIG. 2 is made to skip to the pointer position of the "data 2".

For this reason, the data sets to be written into the FIFO next are written over on the data set indicated by "data 2". Further, since the write pointer indicates the position as shown in FIG. 4B, the data set represented by "data 2" is not read out. Thus the latest data set "data 2" will be substantially erased.

Further, as shown in FIG. 4C, consider the case when the data sets indicated by "data 1" and "data 2", are stored in the FIFO and the value of the read pointer is located at the position of the current RP of the figure. Here where all data sets are to be erased except the latest data set, "erase all other data sets except only the latest data set" is commanded by the erase instruction.

When the above erase instruction is given, the selector 22 shown in FIG. 3 selects the pointer position of "data 2", which is the latest data set, from among the pointer values stored in the stored pointer buffer 21. Select or 22 outputs the selected pointer position one. The WP/RP control unit 23 loads the pointer position ("WP to be stored" of FIGS. 4A and 4C) into the read pointer 13a of FIG. 2.

As a result, as indicated by "current RP" of FIG. 4D, the value of the read pointer 13a of FIG. 2 is made to skip to pointer position of the "data 2".

For this reason, thereafter, the reading of the data sets from the FIFO is performed from the header of the data set indicated by "data 2". Thereby, the data sets other than the latest data set "data 2" will be substantially erased.

Note that, as described above, it may be that the latest data set is to be erased or the remaining data sets are all to be erased while leaving only the latest data set. In either case only the pointer value when the latest data set is input may be stored in the stored pointer buffer 21 as shown in FIG. 3.

In such cases not all write pointer values are stored in the stored pointer buffer 21 shown in FIG. 3. The write pointer value (for example, the pointer value of "data 2" in FIG. 4A) when the latest data set is written is stored in the stored pointer buffer 21 at the time of writing of the data sets into the FIFO. When the erase instruction is input, the write pointer value stored in the stored pointer buffer 21 may be loaded into the write pointer 12a or the read pointer 13a in response to the control signal.

FIGS. 5A to 5D are views for explaining a case where the data sets are written after the specified data set or sets, or alternatively the data sets are written before the specified data set or sets are erased.

As described above, at every time when a write instruction (WE) is given, the value indicated by the write pointer 12a is stored in the stored pointer buffer 21 shown in FIG. 3.

Figure 5A:
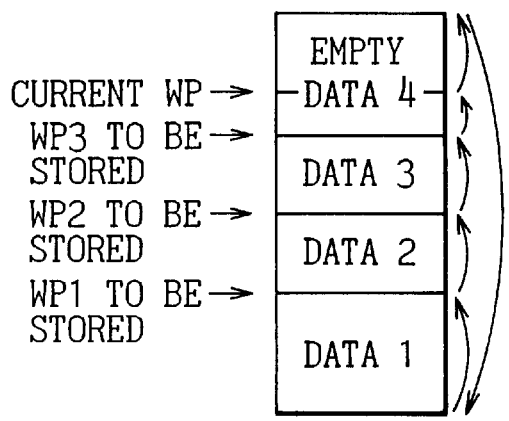
FIGS. 5A to 5D are views explaining the erasing operation by the partial erase control unit of FIG. 3.

Here, as shown in FIG. 5A, consider when the data sets represented by "data 1" to "data 4" are stored in the FIFO, and the write pointer is located at the position of the current WP of the figure. Where the data sets written after "data 3" are to be erased, the pointer position of "data 3" or the address of the stored pointer buffer 21 conforming to the pointer position of "data 3" is specified by the erase instruction. "Erase data sets after the specified pointer position" is commanded by the "control signal" contained in the erase instruction.

When the above erase instruction is given, the selector 22 shown in FIG. 3 selects the pointer position of "data 3" from among the pointer values stored in the stored pointer buffer 21 and outputs the selected one. The WP/RP control unit 23 loads the above pointer position ("WP2 to be stored" of FIGS. 5A to 5D) into the write pointer 12a of FIG. 2.

Figure 5B:
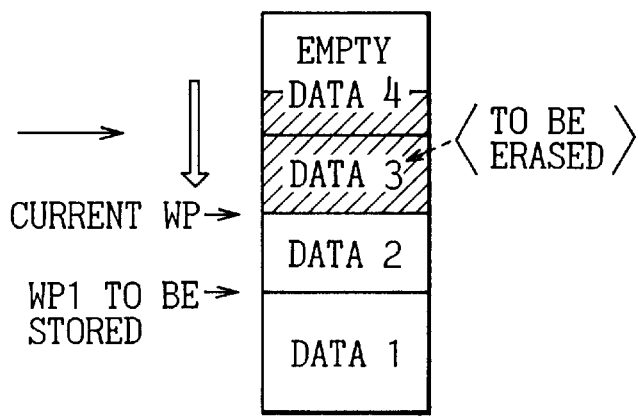

As a result, as indicated by "current WP" of FIG. 5B, the value indicated by the write pointer 12a of FIG. 2 is made to skip to the header position of "data 3".

For this reason, thereafter, the data sets to be written into the FIFO next will be overwritten on the data set indicated by "data 3". Further, since the write pointer indicates the position of FIG. 5B, the data sets indicated by "data 3" and "data 4" are not read out and the latest data sets "data 3" and "data 4", will be substantially erased.

Similarly, by specifying WP1 and WP3 shown in FIG. 5A, the data sets written after the "data 2" or data sets written after "data 4" can be erased.

Figure 5C:
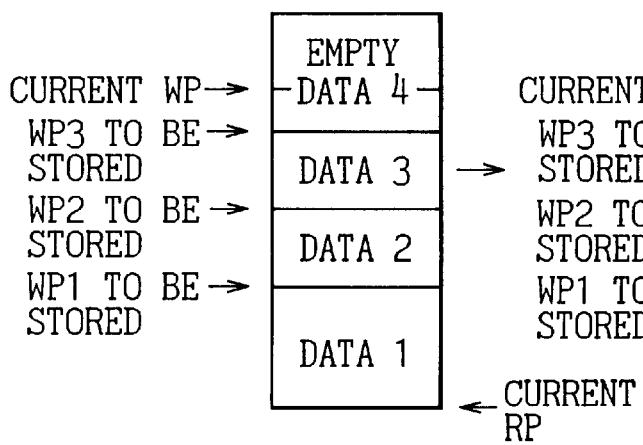

Further, as shown in FIG. 5C, consider when the data sets indicated by "data 1" to "data 4" are stored in the FIFO and the value of the read pointer is located at the position indicated by "current WP" of the figure. Where the data sets written before "data 2" are to be erased, the pointer position of the "data 3" or address of the stored pointer buffer 21 conforming to the pointer position of the "data 3" is specified by the erase instruction. "Erase the data sets before the specified pointer position" is commanded by the "control signal" contained in the erase instruction.

When the erase instruction is given, the selector 22 shown in FIG. 3 selects the pointer position of the specified "data 3" from among the pointer values stored in the stored pointer buffer 21 and outputs the selected one. The WP/RP control unit 23 loads the pointer position ("WP2 to be stored" of FIG. 5C) at the read pointer 13a of FIG. 2.

Figure 5D:
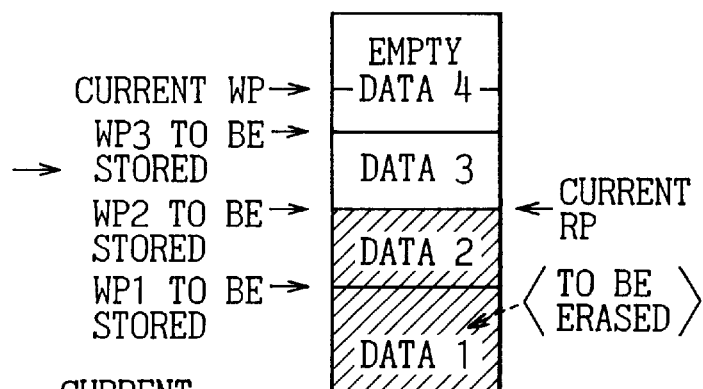

As a result, as indicated by "current RP" of FIG. 5D, the value indicated by the read pointer 13a of FIG. 2 is made to skip to the header position of the data set indicated by "data 3".

For this reason, thereafter, the reading of data sets from the FIFO is performed from the header of the data set indicated by "data 3". The data sets other than the latest data sets "data 3" and "data 4", will be substantially erased.

Note that, even in a case when erasing particular data as in FIGS. 5A to 5D described above, it is also possible to constitute the FIFO buffer so that all write pointer values are not stored in the stored pointer buffer 21 shown in FIG. 3. Indeed, only the pointer value of the data set to be erased is stored therein.

In this case, the pointer value of the data set to be erased (for example, the pointer value of "data 3" in FIG. 5A) is stored in the stored pointer buffer 21. The pointer value of the data set to be erased is specified by the erase instruction. Further, it is specified by the control signal whether the data sets written after the specified data set are to be erased or the data sets written before the specified data set are to be erased. The pointer value of the data set to be erased may be loaded into the write pointer 12a or the read pointer 13a in accordance with the control signal.

Figure 6:
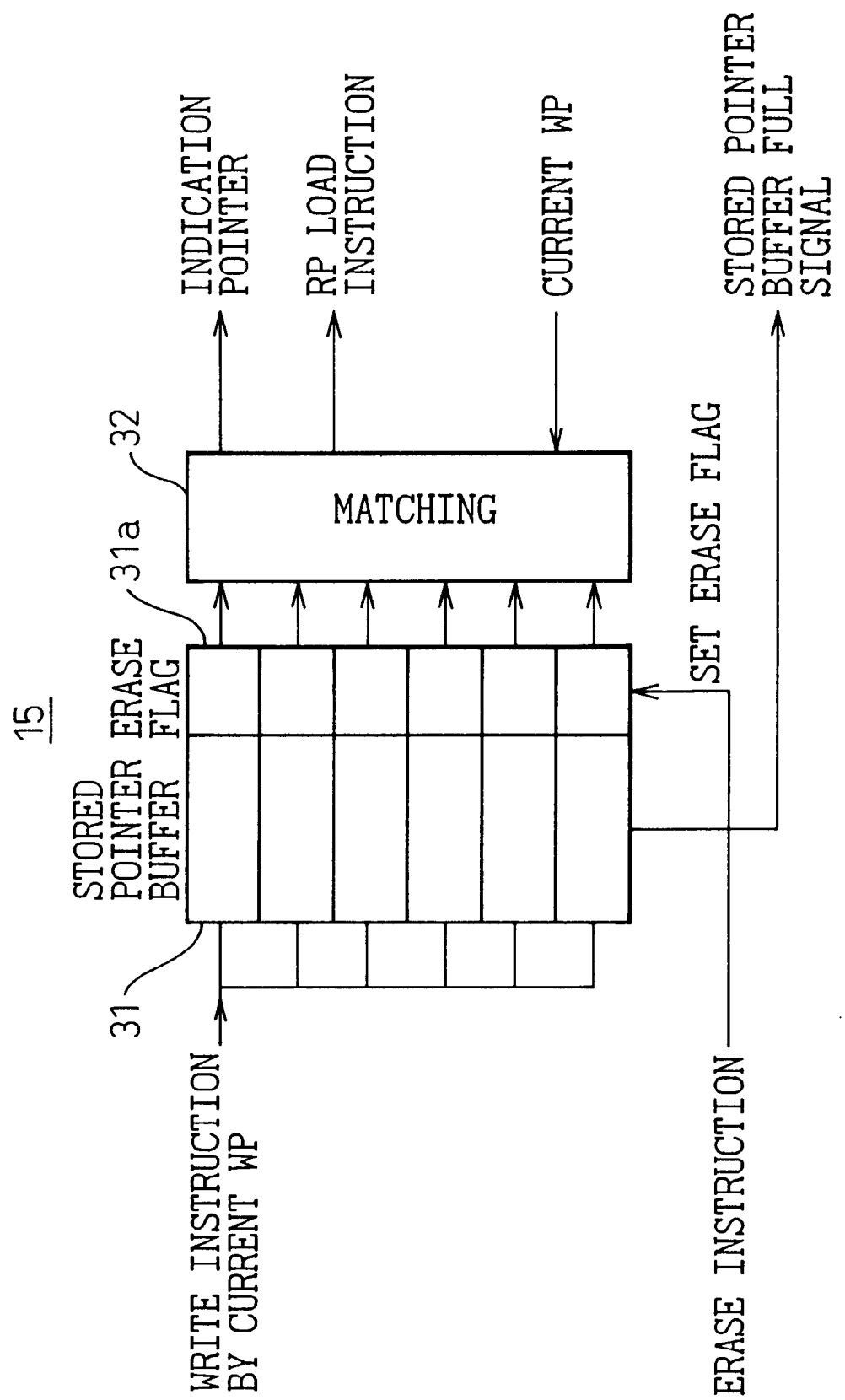
FIG. 6 is a view of a second embodiment of the partial erase control unit.

FIG. 6 is a view of a second embodiment of the partial erase control unit 15.

In the figure a, stored pointer buffer 31 is provided with a memory region of a size corresponding to all pointer values of the data sets which can be stored in the FIFO as described above. Stored pointer buffer 31 stores the write pointer value indicated by the write pointer 12a shown in FIG. 2 when the write instruction (WE) is input to the FIFO. Further, as described above, it may happen that the value indicated by the read pointer 13a in the FIFO exceeds the pointer value stored in the stored pointer buffer 31. At this point in time, the pointer values of the stored pointer buffer 31 smaller than the read pointer value are discarded, and the pointer values of the stored pointer buffer 31 larger than the value of the write pointer 12a in the FIFO are discarded. Namely, only the pointer values of the data sets which can be read from the FIFO are stored in the stored pointer buffer 31.

Further, when the stored pointer buffer 31 becomes full, the stored pointer buffer 31 outputs a stored pointer buffer full signal. The full/empty control unit 14 shown in FIG. 2 outputs a full signal when the stored pointer buffer full signal is input or the FIFO shown in FIG. 2 becomes full.

Further, the stored pointer buffer 31 of the second embodiment is provided with a region 31a for holding an erase flag. Stored pointer buffer 31 attaches the erase flag by an erase instruction given from the outside.

Note that, similar to the above description, in some cases only a write enable signal WE is given from the outside and it is not possible to recognize the data break of each data set. In such cases a signal indicating the break of each data set, such as data start flags, is input from the outside and a write pointer value indicating the header of each data set is written into the stored pointer buffer 31.

A matching means 32 constantly monitors the current value indicated by the read pointer 13a of the FIFO. When the pointer value stored in the stored pointer buffer 31 coincides with the current value of the read pointer 13a and an erase flag is attached to the related pointer value of the stored pointer buffer 31, an instruction for loading the write pointer is output and the pointer value next to the above pointer value is loaded into the read pointer 13a of the FIFO.

The erase instruction is comprised of a "pointer position signal" (or address of the stored pointer buffer 31) and a "control signal" as described above. By this "pointer position signal" (or address of the stored pointer buffer 31) in the erase instruction, the erase flag is set at a specified position in the stored pointer buffer 31.

FIGS. 7A and 7B are views for explaining the operation of the present embodiment for erasing data by using the erase flag. An explanation will be made of the erasing operation of the present embodiment through FIGS. 7A and 7B with reference to FIG. 2 and FIG. 6.

As described above, every time when a write instruction (WE) is given, the value indicated by the write pointer 12a is stored in the stored pointer buffer 31 shown in FIG. 6.

When it is desired to erase a particular data set or sets, an erase flag is set at each pointer value indicating the data set to be erased by the above erase instruction.

Here, as shown in FIG. 7A, consider when the data sets indicated by "data 1" to "data 4" are stored in the FIFO, and the write pointer value is located at the position indicated by the current WP of the figure. If the erase flag is attached to the pointer position of "data 2", the matching means 32 monitors the current value of the read pointer 13a. When the value of the read pointer 13a reaches the pointer position to which the erase flag is attached (pointer position of "data 2" of FIG. 7A), the pointer position WP2 of the next "data 3" is loaded into the read pointer 13a.

As a result, as shown in FIG. 7B, the read pointer value is made to skip to the position of WP2. Thereafter, the reading of the data set from the FIFO is started from the data set indicated by "data 3", and "data 2" will be substantially be erased.

Note that even when desiring to erase a particular data set or sets by using the erase flag as in FIG. 7B, it is also possible to constitute the FIFO buffer so that all write pointer values are not stored in the stored pointer buffer 31 shown in FIG. 6. Instead only the pointer value of the data set to be erased is stored.

In this case, the pointer value of the data set to be erased as well as the erase flag and the next pointer value are stored in the stored pointer buffer 31. When the value indicated by the read pointer 13a reaches the pointer position to which the erase flag is attached (header pointer position of the "data 2" of FIG. 7B), the pointer position WP2 of the header of the next "data 3" may be loaded into the read pointer 13a.

As explained above, according to the present invention, a FIFO buffer is provided for storing a plurality of data sets having different data lengths, which FIFO is provided with a pointer buffer for storing write pointer values. A pointer value stored in the pointer buffer is loaded into a write pointer or a read pointer in accordance with an erase instruction. By this, a particular data set or sets stored in the FIFO buffer are erased. Therefore, it is possible to erase any data set or sets without influencing the data sets not to be erased.

For this reason, the buffer efficiency and transfer rate of the FIFO can be improved. Particularly, in the communication field, when a transmission error occurs, it becomes possible to selectively erase just the erroneous transmission data set in the FIFO buffer while leaving the remaining normal transmission data sets as they are. Accordingly, it becomes possible to eliminate unnecessary retransmission and improve the transfer rate.

What is claimed is:

1. A FIFO buffer capable of partially erasing data, said FIFO buffer comprising:

a memory storing data according to a plurality of addresses;

a write pointer specifying an address for writing data into said memory;

a read pointer specifying an address for reading data from said memory; and a pointer buffer storing a pointer value of said write pointer, the stored pointer value being stored to said pointer buffer when corresponding data is written into said FIFO buffer, and the stored pointer value being loaded into said write pointer or said read pointer, where in response to an erase instruction, whereby a specified part of the data stored in said memory can be erased.

2. A FIFO buffer capable of partially erasing data as set forth in claim 1, wherein:

a plurality of memory regions are provided in said pointer buffer; and the pointer value of said write pointer is stored in a respective memory region of said pointer buffer each time data is written into said memory.

3. A FIFO buffer capable of partially erasing data sets as set forth in claim 1, wherein the latest written data set is or the data sets after any particular pointer value are erased by loading the pointer value stored in the pointer buffer at the write pointer.

4. A FIFO buffer capable of partially erasing data as set forth in claim 2, wherein the latest written data or the data after a specified pointer value is erased by loading the stored pointer value into said write pointer.

5. A FIFO buffer capable of partially erasing data as set forth in claim 1, wherein all data except the latest written data or all data before a specified pointer value is erased by loading the stored pointer value into said read pointer.

6. A FIFO buffer capable of partially erasing data as set forth in claim 2, wherein all data except the latest written data or all data before a specified pointer value is erased by loading the stored pointer value into said read pointer.

7. A FIFO buffer capable of partially erasing data as set forth in claim 1, wherein:

said pointer buffer is provided with a region for holding an erase flag to be set at a specified pointer value; and when the value of said read pointer reaches the specified pointer value, the pointer value next to the specified pointer value is loaded into said read pointer, whereby the data of the specified pointer value can be erased.

8. A FIFO buffer capable of partially erasing data as set forth in claim 2, wherein:

said pointer buffer is provided with a region for holding an erase flag to be set at a specified pointer value; and when the value of said read pointer reaches the specified pointer value the pointer value next to the specified pointer value is loaded into said read pointer, whereby the data of the specified pointer value can be erased.

9. A FIFO buffer capable of partially erasing data as set forth in claim 1, wherein the pointer value to be loaded into said write pointer or said read pointer is directly given from the outside.

10. A FIFO buffer capable of partially erasing data as set forth in claim 2, wherein the pointer value to be loaded into said write pointer or said read pointer is directly given from the outside.

11. A FIFO buffer capable of partially erasing data as set forth in claim 3, wherein the pointer value to be loaded into said write pointer or said read pointer is directly given from the outside.

12. A FIFO buffer capable of partially erasing data as set forth in claim 4, wherein the pointer value to be loaded into said write pointer or said read pointer is directly given from the outside.

13. A FIFO buffer capable of partially erasing data as set forth in claim 5, wherein the pointer value to be loaded into said write pointer or said read pointer is directly given from the outside.

14. A FIFO buffer capable of partially erasing data as set forth in claim 6, wherein the pointer value to be loaded into said write pointer or said read pointer is directly given from the outside.

15. A FIFO buffer capable of partially erasing data as set forth in claim 1, wherein the pointer value to be loaded into said write pointer or said read pointer is determined by specifying an address of said pointer buffer.

16. A FIFO buffer capable of partially erasing data as set forth in claim 2, wherein the pointer value to be loaded into said write pointer or said read pointer is determined by specifying an address of said pointer buffer.

17. A FIFO buffer capable of partially erasing data as set forth in claim 3, wherein the pointer value to be loaded into said write pointer or said read pointer is determined by specifying an address of said pointer buffer.

18. A FIFO buffer capable of partially erasing data as set forth in claim 4, wherein the pointer value to be loaded into said write pointer or said read pointer is determined by specifying an address of said pointer buffer.

19. A FIFO buffer capable of partially erasing data as set forth in claim 5, wherein the pointer value to be loaded into said write pointer or said read pointer is determined by specifying an address of said pointer buffer.

20. A FIFO buffer capable of partially erasing data as set forth in claim 6, wherein the pointer value to be loaded into said write pointer or said read pointer is determined by specifying an address of said pointer buffer.

21. A FIFO buffer capable of partially erasing data as set forth in claim 7, wherein the pointer value to be loaded into said write pointer or said read pointer is determined by specifying an address of said pointer buffer.

22. A FIFO buffer capable of partially erasing data as set forth in claim 8, wherein the pointer value to be loaded into said write pointer or said read pointer is determined by specifying an address of said pointer buffer.

* * * * *

UNITED STATES PATENT AND TRADEMARK OFFICE
CERTIFICATE OF CORRECTION

PATENT NO.: 5,907,716
DATED : May 25, 1999
INVENTOR(S): Noritsugu YOSHIMURA

It is certified that error appears in the above-identified patent and that said Letters Patent is hereby corrected as shown below:

On the title page, [57] Abstract, line 10, after "value" (first occurrence) insert --....can be erased. Further, an erase flag is set...--

Col. 9, line 2, delete "set is";
line 3, delete "sets:";
line 3, change "any particular" to --a specified--;
line 3, change "are" to --is--;
line 4, delete "stored in the pointer buffer at the";
line 5, before "write" insert --into said--.

Signed and Sealed this

Fourteenth Day of December, 1999

Attest:

Q. TODD DICKINSON

Attesting Officer

Acting Commissioner of Patents and Trademarks